UNITED STATES PATENT OFFICE 2,578,003

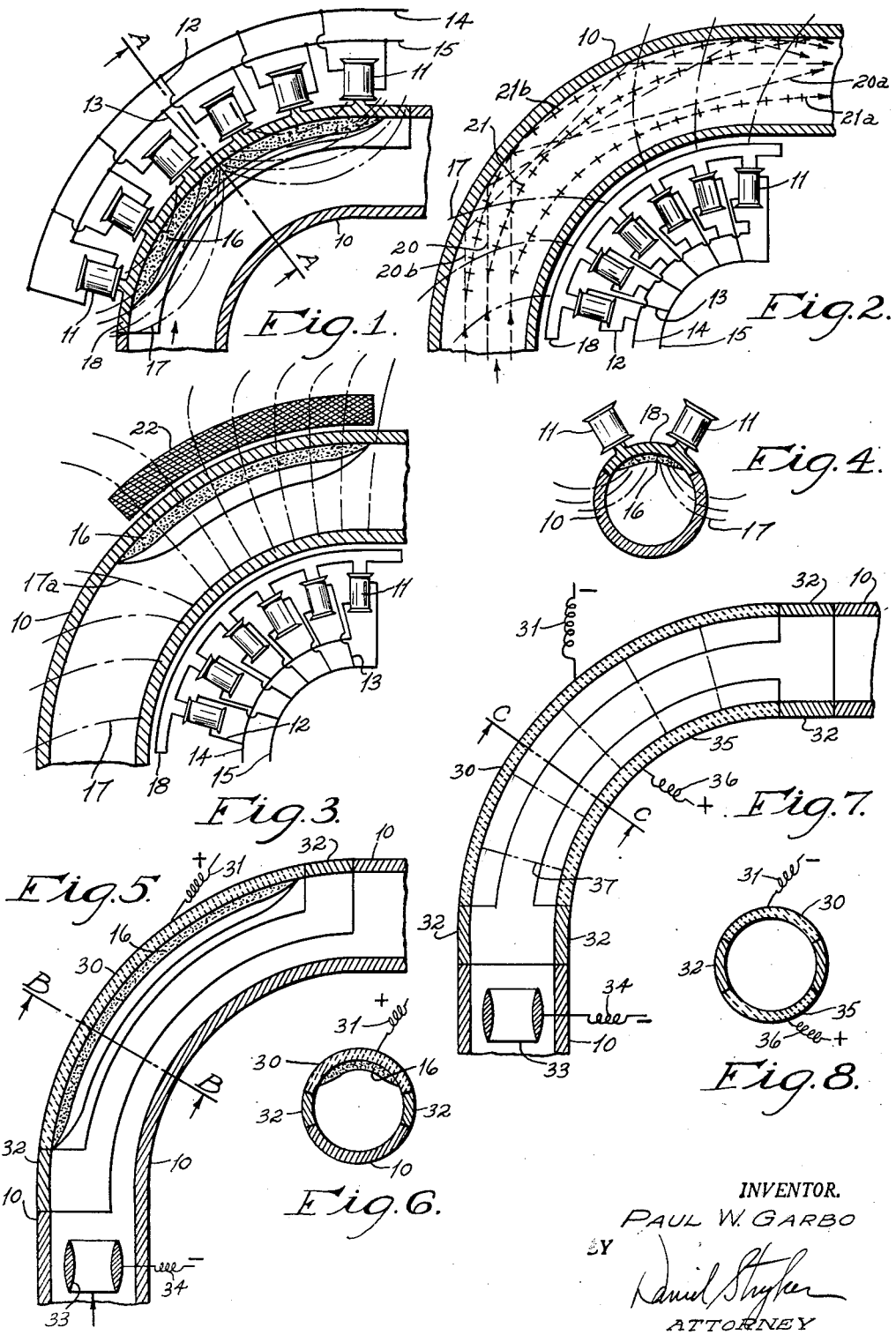

PREVENTION OF EROSION BY MOVING SOLIDS

Paul W. Garbo, Freeport, N. Y., assignor to Hydrocarbon Research, Inc., New York, N. Y., a corporation of New Jersey Application March 26, 1947, Serial No. 737,390

14 Claims. (Cl. 302—66)

The present invention relates to the protection of apparatus from the erosive and abrading effect of fluid-borne solids and is more particularly concerned with minimizing or eliminating the objectionable wear which occurs in conduits, chambers, reactors and other equipment subjected to the passage of gases or vapors containing entrained solid particles.

The pneumatic transportation of solid particles, as is known, may result in undue abrasive action upon the confining conduits and other equipment particularly at points where the fluid flow rapidly changes direction, as for example in the vicinity of deflecting surfaces and at conduit elbows and bends. When the solid particles are of sharp and abrasive character, and/or where they move at a substantial velocity, frequent replacement of abraded and eroded parts may be necessary.

This problem may be well illustrated with reference to the commercial processes employing finely divided catalysts which are suspended or entrained in gaseous reactants or other gasiform conveying media. As is known and widely practiced in the petroleum treating and refining art, the powdered catalyst may be suspended in an up-flow of reactant gases during catalytic treatment, either fully entrained in the flow of gas or else held in the known state of dense phase fluidization where a mass of catalyst powder in aerated condition is subjected to passage of the gases therethrough. Even during simple dense phase fluidization treatment with gasiform reactants, the more or less inevitable entrainment of at least a small portion of the catalyst particles in the gaseous effluent causes an objectionable abrasive effect in the outlets. Moreover, when operating under conditions of dense phase fluidization, it is common practice to provide for periodic or continual transfer of at least a portion of the catalyst in the system, as, for example, between selected zones of regeneration, reaction, cooling and the like. Such procedure is found commercially in the catalytic cracking of petroleum fractions as well as other catalytic hydrocarbon treatment, such as catalytic reforming, cyclization, isomerization, Fischer-type synthesis and the like. Usually in such processes the catalysts are of abrasive character and must be handled at gas velocities such that severe "blasting" of deflecting apparatus surfaces occurs.

In the actual operation of commercial fluid cracking plants as much as fifty tons of catalyst per minute may be circulated pneumatically between the reactor and regenerator with commensurate wear of the conduits, loss of operating time for repairs and possible undesirable contamination by material worn or abraded from the surface of the apparatus.

It is an important object of the present invention to obviate the foregoing disadvantages by protecting apparatus and equipment, particularly portions thereof subject to wear, from the blasting and abrasive effect of pneumatically or fluid conveyed particles.

In accordance with the present invention, the equipment is protected by minimizing or eliminating the impacting tendency of moving solid particles upon the wall surfaces through the effect of a controlled field of force. Broadly, the advantages of the invention may be secured in accordance with either of two specific procedures, namely, by causing at least a single layer of the solid particles to adhere more or less firmly to the surface to be protected and thus to form a protective coating, or by deflecting at least a substantial proportion of the particles in a path which largely or completely avoids abrasive contact with the apparatus surfaces.

Stated in another way, the controlled field of force may be so arranged as to alter the normal movement of the entrained particles to a degree where the abrasive action is lessened or completely obviated. In other words, in the absence of the force field, at least some of the particles would follow a path of movement in which they would be directed at an objectionable velocity against a surface in abrading relationship. The present invention utilizes the mechanical effect of the force field to alter said movement in any manner favorable to diminishing the abrasion of the confining or deflecting surface. This alteration may consist of deflection of the particles from their normal path of movement or a decrease in the rate of movement of some of them, or both. Either of these types of alteration in movement involve a change in the particle velocity as compared with their normal movement and the invention therefore contemplates an appropriate alteration in velocity combined, where desired, with a holding or restraining effect to dispose some of the particles in a protective position with respect to the surface to be protected.

In the foregoing, it should not be understood that the controlled field of force acts in such a way as to place any important restriction on the flow of particles past the part of the equipment which it is desired to protect. It is, in fact, important in pneumatic and similar flow systems to keep the pressure drops in the flow lines to a minimum. The pressure drop in such a line arises from the resistances which the gas or vapor encounters in moving itself and its entrained solids from one point to another at the desired rate. Only those resistances or components thereof which act upon the gas or solid in a sense opposite to the desired direction of flow are significant.

It is important to observe that when I dispose a force field in the solids flow path so as to deflect a substantial part of the solid particles from their prior path, the force acts in a direction perpendicular to that path and such that the altered path curves away from the obstacle or wall which it is desired to protect. The vector velocity of the particles is changed but the non-vector speed is not substantially affected. Substantially all of the work involved in changing the path of the particles is done by the devices which generate the force field, substantially none by the pneumatic system. In fact, in the practice of this form of my invention the pressure drop in a pneumatic transport pipe is often actually reduced by the imposition of a force field at wear points because the frictional contacts between particles and wall are sharply reduced, as will be explained in detail in connection with the accompanying figures.

In the form of my invention in which a protective layer of particles is formed, the field and the poles which generate it are so disposed as to penetrate the path of flow only to a relatively shallow depth. There will be a slight increase in pressure drop in the system due to the roughness of the layer of particles compared to bare metal but there will be a counter-balancing advantage in the protection of large pipes and vessels, namely, that the force field need not be designed to penetrate the entire cross-section of the pipe or vessel. There will be a consequent saving in energy.

What I consider to be the appropriate field for each type of protection will appear in the following.

Advantageously the formation of a protective coating of particles may be accomplished by magnetic means wherein magnetically susceptible particles in a flow of gas, for example, are attracted by suitably disposed magnets to a predetermined interior area of a conduit surface and retained in a layer of any desired thickness. The protecting layer may be periodically released by, for example, releasing the source of electric energy to the electromagnetic means, or the magnetic flux may be adjusted to such a value that the protective layer is moved gradually across the magnetic area by the flow of fluid and thus continually carried past the magnetic area at a rate sufficiently reduced to obviate wear.

Alternatively, the invention contemplates the provision of an electrostatic field for accomplishing the same physical effect. In short, maintenance of a high tension field in the vicinity of the area to be protected may be made to attract the particles toward the surface as a protective deposit.

Obviously, when proceeding in accordance with the embodiment of the present invention employing a magnetic field, the particles must possess appreciable magnetic susceptibility and this aspect of the invention is thus applicable particularly to pneumatically conveyed particles composed of iron, cobalt, nickel, and the like. Many processes for the synthesis and alteration of hydrocarbons employ catalysts of this character as, for example, known catalysts used in the catalytic reduction of carbon monoxide with hydrogen, in cracking and the like. The invention is therefore particularly adaptable to the pneumatic handling of catalysts in such processes and will be hereinafter more fully described in connection therewith. On the other hand, the invention is not so limited but is equally useful when employing force fields of the magnetic type if a small amount of magnetic material is incorporated in a non-magnetic catalyst. Thus, for example, in reactions such as the catalytic conversion of heavy hydrocarbons with naturally occurring siliceous materials such as bentonite clays, fuller's earth, montmorillonite clays, and the like, a small percentage of a ferro-magnetic substance such as iron or nickel may be incorporated in any conventional manner. Thus the catalyst may be impregnated with a small amount of a salt or an oxide of the metal followed by drying and reduction with a gas such as hydrogen. Other catalysts such, for example, as the synthetic clay-like catalyst of the silica-aluminum-complex type, synthetic magnesium-silicate, and the like, may be treated in this manner or the magnetic material may be incorporated by co-precipitation from a salt solution followed by reduction as before. Moreover, the catalyst may comprise a ferro-magnetic core or support with the active material deposited thereon in any known manner.

It should be observed that where it is intended to build up a layer of solid particles on the surface to be protected, it is not essential that all the particles be magnetic. Accordingly, whatever may be the character of the flowing solids, a small amount of magnetic particles may be added to the stream continuously or at intervals and transported to the point where they will form the desired protective layer.

In the event where catalysts comprising a magnetic metal are subjected to an excessive oxidative treatment during use, it may be desirable to introduce a reducing gas subsequent to the oxidative treatment and before the catalyst reaches any part of the system in which a magnetic field is applied. Reduction may be readily accomplished with hydrogen, methane, ethane, or other reducing fluids. So also in processes involving excessively high temperatures and a corresponding loss of magnetic susceptibility, it may be advisable to cool the catalyst before approaching the magnetic field. This may be accomplished by any suitable cooling means, such as heat transfer equipment or by quenching with a stream of cooling gas or liquid.

That aspect of the present invention having to do with control of pneumatically conveyed particles by a controlled force field of the electrostatic type has numerous practical advantages in connection with most rapidly moving streams of catalyst and the like of which I am aware. More specifically, it is an inherent property of such particles moving in a vessel or conduit that a charge of electrostatic electricity is accumulated on each particle depending in magnitude and polarity upon the particular solid materials being conveyed, the material of construction of the vessel or conduit, and the condition of conveyance. Thus, in the presence of a fixed electrostatic field set up between spaced charged electrodes of opposite sign, the particles will be deflected toward one of the electrodes depending upon their charge. It is important to note that operating in this manner, extensive research is not necessary in order to determine the inherent charge upon the particles since the correct operation may be readily determined by simply reversing the charge upon the two electrodes until the proper condition prevails.

A further important advantage lies in the fact that the electrostatic method is applicable to many materials, particularly nonconductors of electricity, which require special treatment before they will respond to a magnetic field.

Another important advantage follows from the fact that a charge may readily be induced upon the particles at some point in advance of their approach to the fixed electrostatic field and the particles may accordingly be deflected in any desired direction in the field by appropriate selection of polarity at the two electrodes. Many other modifications and advantages will be apparent to those skilled in the art of electrostatic and electromagnetic separation of solids and it is an important aspect of the present invention that all of these prior known techniques are available for the purposes of deflecting pneumatically conveyed particles either into a protective layer or else away from the vicinity of surfaces to be protected.

It is of particular significance to note that the control of entrained particles with an electrostatic field is particularly useful in the latter above-mentioned aspect of the invention where the entrained particles are deflected away from surfaces with which they would otherwise impact or abrade. Thus, as is known, pneumatically supported particles are readily caused to migrate away from areas of intense electrostatic concentration as, for example, in concentrated electrostatic fields about sharpened points or other limited charged areas in the vicinity of which the particles may assume an induced charge of like polarity and be promptly repelled.

In order to more clearly define the invention in connection with actual preferred illustrative embodiments, reference is now made to the figures of the attached drawings wherein Figure 1 represents more or less diagramatically a bend or elbow in a conduit provided with magnetic means for building up a protective layer of solids at the wear point;

Figure 2 is a magnetic arrangement for deflecting particles away from the wear point;

Figure 3 represents a combination of the previous two features;

Figure 4 shows a section of the bend of Figure 1 taken along line A—A;

Figure 5 is an arrangement for building a protective layer of particles with electrostatic forces;

Figure 6 is a section of the bend of Figure 5 taken along line B—B;

Figure 7 is another electrostatic system, designed to deflect the flowing particles from the wear surface; and Figure 8 is a section of the bend of Figure 7 taken along line C—C.

Referring more particularly to Figure 1, the numeral 10 designates a cylindrical tube or conduit having a right angle bend through which passes a flow of gas having entrained therein abrasive particles of high magnetic susceptibility. The pneumatic flow travels upwardly in the direction indicated by the arrow and normally would result in a severe blasting or abrasive effect at the outer surface of the curve. In accordance with the present invention, however, the said outer surface is provided with a series of electromagnets 11, each connected by leads 12 and 13 with bus bars 14 and 15, respectively.

The bus bars 14 and 15 are supplied with electric current from any suitable source to energize the magnets 11, as the result of which a layer of solid particles 16 is attracted to and held against the outer curved surface of the conduit in a protective layer. Obviously, the thickness of the protective layer may be predetermined and controlled in accordance with the strength of the magnetic field applied, and similarly, under sufficiently reduced field intensity, the protective layer may be permitted to migrate slowly through the field under the influence of the moving gas stream.

Dot-dash lines 17 represent the lines of magnetic force emanating from the electromagnets 11. It will be observed that the current in the electromagnets is preferably such that the magnetic field penetrates only part way into conduit 10. In this manner, the protective blanket of solid particles 16 can be built up without unduly influencing the path of the remaining particles and thereby exaggerating the concentration of solid flow on the outside of the bend which normally takes place.

It will obviously be of advantage (but not essential to the functioning of my invention) that the conduit 10 or at least the elbow or curved portion thereof be composed of some suitable non-magnetic material such, for instance, as stainless steel, bronze, or even plastic. It will further be of advantage if the outer surface of the bend be an insert of magnetic material such, for instance, as ordinary carbon steel, and be connected to the cores of electromagnets 11 so as to form a common pole-piece 18.

If desired, electromagnets 11 may be replaced with a single electromagnet having a large core and pole-piece.

Another acceptable arrangement is for conduit 10 to be continuous throughout the bend without any insert and for pole-piece 18 to be located contiguous to its outer surface. This last arrangement is comparatively inexpensive to construct but entails the use of more electric current to generate the necessary magnetic field.

Figure 1 represents the preferred embodiment of my invention when conduit 10 is six inches or more in diameter and when handling magnetically susceptible solids or non-magnetic solids to which the addition of magnetic particles is feasible.

Referring to Figure 2 of the drawing there is disclosed a similar conduit 10 composed, preferably, of a material of low magnetic susceptibility. Electromagnets 11 are disposed on the inside of the pipe bend, preferably with their common pole-piece 18 outside of conduit 10 to give a relatively uniform distribution of field intensity across the path of flow. Dot-dash lines 17 again represent the lines of force which, in contrast to Figure 1, will be seen to cross the entire conduit. This is accomplished by positioning pole-piece 18 outside of conduit 10 and by using a relatively high current in the winding of electromagnets 11. Dashed lines 20 represent the paths of typical solid particles in the absence of the magnetic field. The paths 20 are idealized somewhat by neglecting the influence of other particles in the flowing stream. Cross lines 21 represent the paths of the same particles under the influence of a properly adjusted magnetic field. It is to be observed that the current in the windings of electromagnets 11 is preferably adjusted to the point where the solid particles which enter the bend 10 closest to its inner curvature have their paths 20a changed to paths 21a which latter closely approximate the inner curvature of bend 10 without actually being attracted to the wall. Since the strength of the field is somewhat less at the outside of conduit 10 as shown by the greater distance between lines of force 17 and since a slightly greater force will be required to divert the outer particles, the particles which travel near the outside of conduit 10 will not have their paths 20b completely corrected. Their final paths 21b will permit contact with the wall of conduit 10, albeit much less abrasive contact than in the absence of the magnetic field.

Figure 3 represents an arrangement similar to Figure 2 except that a block 22 of ferro-magnetic material is located immediately contiguous to the outer wall of conduit 10. This block 22 serves to straighten the lines of force 17 which lie between it and magnets 11. Block 22 receives induced magnetism from the field of magnets 11 and therefore attracts to itself a protective layer of particles 16. The arrangement of Figure 3 possesses the advantage of providing a protective blanket of solid particles for the wear surface and at the same time preventing the undue concentration of solids in the outer part of the bend which is characteristic of systems which lack this particular type of protection.

If desired, block 22 can be an insert in conduit 10 or can be an extension of the cores of electro-magnets 11 which pass in crescent fashion around conduit 10.

Figure 3 represents the preferred embodiment of my invention when handling magnetically susceptible solids and when conduit 10 is 4 inches in diameter or smaller.

Figure 4 shows a cross-section of the bend of Figure 1 taken in plane A—A. It is important to note that pole-piece 18 is preferably made to conform to the shape of pipe bend 10 whether the pole-piece is an insert in the bend as shown in Figure 1 or is separated from the bend as in Figure 2. The pole-piece should preferably cover about one-third to one-half of the conduit circumference whether the installation operates by building up a protective layer as in Figures 1 and 4 or by deflection of particles as in Figure 2.

One skilled in the art of magnetic separation will be aware of numerous possible modifications of the above schemes. All such known modifications are within the scope of this invention. In fact, it will be workable, but wasteful of power, for conduit 10 to be composed entirely of common steel in any of the above arrangements.

Figure 5 discloses an arrangement particularly suited to the protection of a bend from erosion by electrically non-conductive particles. There is shown again a conduit 10 having an elbow bend. A conductive plate 30 connected to any suitable source of direct high tension electric potential by lead 31 forms the outer wall of the bend. Electrode 30 is surrounded and separated from conduit 10 by an insert 32 composed of some suitable insulating material such as phenol-formaldehyde resin. When connected in the indicated fashion electrode 30 sets up in the path of solids flow a controlled force field of the electrostatic type. In Figure 5, electrode 30 is shown to be charged positively. A negative charge may also be used depending upon conditions. Conduit 10 should preferably be at ground potential.

It is to be noted that the specific apparatus for creating the proposed electrostatic charges forms no part of the present invention, and being conventional, is not disclosed herein. Suffice it to say, however, that any suitable mechanical or electrical generation and rectifying systems may be employed such, for example, as a motor-exciter-generator and mechanical interrupter arrangement driven by a single shaft.

The potential on the electrode will depend upon the materials under treatment, the shape and size of the plate and the dielectric characteristics of the insulator and of the gas or vapor passing through the conduit. Normally a potential of 10,000 to 30,000 volts will be satisfactory.

In the arrangement of Figure 5, at least some of the pneumatically borne particles reaching the elbow will be deflected by the force field in either direction. For example, in the embodiment shown, at least some of the particles, having a negative charge, are deflected toward the outer surface of the elbow and held thereagainst in a layer 16 analogous to the operation disclosed in Figure 1. Where, however, the particles employed in the system have a positive charge, the same effect may be achieved by merely impressing a negative potential on plate 30.

Figure 5 of the drawing additionally discloses means for selectively inducing any desired charge upon the particles, where such is desired. To this end, a metallic ring 33 is supported by means not shown in the interior of the conduit at a point substantially in advance of the elbow and is connected by a lead 34 with any suitable source of direct current electricity, not shown, adapted to impose a high tension charge upon the ring 33. Thus, if it be assumed that the potential upon the ring 33 be a negative potential of about 20,000 volts, the solid particles conveyed through the conduit will receive a corresponding charge on their passage about the ring and thus be preferentially attracted by the plate 30 having a positive charge. As will be obvious to those skilled in the art in view of the above, the foregoing is merely illustrative and the charge-inducing assembly 33 may be so arranged as to induce a positive charge on the particles while the plate 30 is negatively charged to attract a positive layer or positively charged to repel particles.

Under favorable conditions as regards materials being handled, the flowing particles will acquire a sufficient charge by virtue of their contact potential relative to the material of construction of conduit 10 so that the charging assembly 33 can be dispensed with entirely.

The arrangement of Figure 5 is the preferred embodiment of my invention when handling non-conductive particles in a conduit 6 inches or more in diameter.

It should be noted that the same arrangement can be made to repel particles from the outer wall of conduit 10 by simply reversing the sign of the charge on electrode 30, all other conditions remaining unchanged. However, for such purposes, the arrangement shown in Figure 7 is preferred.

Still referring to Figure 5, if desired for process reasons, the polarity of electrode 30 can be reversed for a short period from time to time and then restored to its original sign. By this means the protective layer is periodically shed and reformed from fresh particles. Thus, it is possible to prevent catalyst particles from staying indefinitely in one place under reaction conditions, a state of affairs which, in some processes, may result in the formation of tarry by-products in the stagnant layer of catalyst.

It should be emphasized that it is unnecessary and even undesirable for all of the particles to be attracted to electrode 30. The attraction is controlled by the magnitude of the potential impressed on the electrode.

If the particles to be transported or a substantial fraction of them are electrically conductive, the arrangement of Figure 5 should be modified as will be stated now. Insulating insert 32 is extended to comprise the entire area of the outside of the bend, or, if more convenient, to constitute the entire bend. Electrode 30 is then placed immediately contiguous to the outer wall of the bend. This arrangement requires the development of a somewhat higher potential on the electrode, say about 20,000 to 100,000 volts. There is thus avoided the loss of electrical energy and the creation of large quantities of heat by the arcing of electricity from one conductive particle to another.

Figure 6 is a section of the bend shown in Figure 5 taken on plane B—B. Electrode 30 should cover about one-third to one-half of the pipe circumference. Insulating insert 32 is shown on both sides of electrode 30.

Figure 7 shows another electrostatic means for protecting a pipe bend from erosion by electrically non-conductive particles. The arrangement of Figure 7 is the same as that of Figure 5 except that a second electrode 35 with lead 36 oppositely charged to electrode 30 forms the inside wall of the bend. Insert 32 is extended to insulate the electrodes from one another and from conduit 10. Electrode 30 is charged so as to repel the stream of particles, and electrode 35 to attract them. The lines of force 37 between the electrodes act upon the passing particles in a manner analogous to the magnetic field of Figure 2 thereby diverting the particles from the wear surface on the outside of the bend. It will be observed that it is easier to obtain a nearly ideal arrangement of the force field for this purpose electrostatically than magnetically.

The means of charging the particles are the same as in Figure 5. The steps to be taken, if electrically conductive particles are to be handled, are obvious from the discussion of Figure 5.

Figure 8 is a section of the pipe bend of Figure 7 taken on plane C—C.

Figures 7 and 8 represent the preferred embodiment of my invention when non-conductive particles are to be handled in pipes 4 inches or less in diameter.

An advantageous combination of the features of Figures 5 and 7 can be obtained when the charging of the particles is accomplished simply by the contact potential method. Thus, if it is found, for instance, that the material to be handled acquires a negative charge through contact with the material of conduit 10, a small amount of another substance which will acquire a positive charge may be added to the flowing stream continuously or at intervals. The main stream of negatively charged particles will be diverted from the wear surface of a pipe bend by an arrangement of electrodes charged as shown in Figure 7, while the positively charged auxiliary material will be attracted to electrode 30 where it will form a protective layer. Thus, for instance, if ground fluorspar is to be pneumatically conveyed through an aluminum pipe or if the section of pipe immediately before the bend is made of aluminum, the fluorspar will acquire a negative charge. If a small amount of limestone, which often occurs with fluorspar, be added to the stream, the limestone will be positively charged and form a protective layer referred to above.

Similarly, if the contact potential method of charging is to be used with an arrangement of the type of Figure 5 and it is found that the material to be handled will not acquire a sufficient charge during transport, in other words, that its contact potential is too close to that of the conduit, a small amount of material which will acquire a suitable charge may be added to the flowing stream continuously or at intervals. This material will serve to build up the desired protective layer. The above step is analogous to the one of adding a magnetic material to a stream of non-magnetic material in order to form a protective layer under the influence of a magnetic field.

Referring again to Figure 7, spaced, sharp-pointed projections may be placed on the inner face of electrode 30 to accentuate the repulsion of particles from that area. Many other modifications within the scope of this invention will occur to one skilled in the art of electrostatic separation.

It will be obvious to anyone skilled in the art that in all embodiments of my invention care should be taken to provide smooth joints between inserts, electrodes, pole-pieces and conduits at the faces of the bend walls which are in contact with the flowing fluid and solids.

In accordance with one example, a flow of vaporized crude petroleum at a temperature of about 1000° F. entraining a substantial proportion of solid, regenerated cracking catalyst particles composed essentially of synthetic magnesium silicate is passed through a 24-inch conduit having an elbow substantially identical with that shown in Figure 5. The conduit 10 and electrode 30 consist of ordinary carbon steel which is normally used for such service. The insert 32 is composed of insulating material one-half inch thick, shaped to fit the contour of the pipe. Charging assembly 33 is maintained at a negative potential of about 25,000 volts relative to ground. Electrode 30 is maintained at a positive potential of about 20,000 volts relative to ground. At a linear vapor flow of about 20 feet per second there is formed on electrode 30 a rather firmly held layer of catalyst particles about one-eighth inch thick and a less firmly held blanket of somewhat greater thickness. Substantially no abrasion of the elbow is noted over long periods of operation during which wear would have become excessive in the absence of the present protecting means. At intervals of about two minutes, electrode 30 is given a negative potential for about five seconds after which the positive potential is restored. During the five-second period the protective layer is sloughed off, a new one being formed as soon as the original polarity is restored. This reversal of potential prevents the accumulation of tarry material on the attracted catalyst particles to the point that the particles become caked on the conduit wall.

In accordance with another example, a flow of gaseous reaction products from a Fischer-type synthesis reactor at a temperature of about 600° F. entraining a substantial proportion of solid catalyst particles composed essentially of iron is passed through an elbow in a 4-inch conduit. The elbow, substantially identical to that of Figure 3, is made of stainless steel. At a linear gas flow of about 20 feet per second, a major fraction of the particles is diverted from the normal path and prevented from striking the outside wall of the pipe, while another and smaller fraction is attracted to the outside wall and forms a protective layer thereon about one-eighth inch thick.

It is important to note that the present invention is not limited to protection of conduits as indicated above, since it is equally applicable to the protection of all apparatus and equipment subject to erosion from fast-moving solid particles. For example, the invention may be equally applied to the upper end of a conventional cylindrical reactor having a cone or bell-shaped upper extremity which merges into an outlet conduit through which the products of reaction are removed. Obviously, the instrumentalities producing the controlled force field of the present invention may be so arranged with respect to the upper end as to protect the interior surfaces in accordance with the foregoing exemplifications. A number of similar arrangements will at once occur to those skilled in the art in view of the foregoing.

The invention, moreover, is not limited to catalytic processes, but is obviously adapted to any transportation systems for raw materials in finely divided form, such as conventional pneumatic ore handling devices. Insofar as catalytic conversions are concerned, the invention is rather broadly applicable not only to catalytic hydrocarbon treatments mentioned above, such as cracking, polymerization and the like, but also to the production of ammonia from nitrogen and hydrogen, synthesis of hydrocarbons and/or oxygenated derivatives with catalysts of the iron group and various hydrogenation processes, all wherein comminuted solids or catalysts are conveyed in a fluid flow.

It is to be understood that the term "pneumatic flow" or "pneumatically entrained" as used herein refers not solely to the use of air as a conveying agent, but comprehends all gasiform materials, either gases or vapors. In its broadest aspect, the invention is applicable to the handling of comminuted solids suspended in liquid streams preferably where the liquid is non-conductive in character.

Moreover, the term "controlled field of force" as used herein is defined as a field of mechanical effort operative to displace, repel, hold, or retard solid particles in their path of movement, as exemplified by magnetic and electrostatic fields.

While the invention has been described in connection with certain illustrative embodiments, these are presented by way of example rather than limitation, and I do not mean to be restricted thereto except as indicated by the scope of the following claims.

I claim:

1. In the transportation of comminuted solids by suspension in a moving fluid stream, the method of controlling the abrasive contact of said solids with a curvilinear surface confining said fluid stream substantially without changing the quantity of said solids suspended in said moving fluid stream, which comprises subjecting said solids suspended in said moving fluid stream to a controlled field of force operative to check the abrasive contact of said solids with said curvilinear surface.

2. The method as defined in claim 1 wherein said field of force comprises a magnetic field.

3. The method as defined in claim 1 wherein said field of force comprises an electrostatic field.

4. In the transportation of solid particles entrained in a gasiform stream, the method of protecting a curvilinear confining surface against the abrasive effect of said moving solid particles normally directed against said surface substantially without changing the quantity of said particles entrained in said gasiform stream which comprises subjecting said stream to a controlled field of force operative to hold a portion of said particles in a protective layer against said surface.

5. In the transportation of solid particles entrained in a gasiform stream, the method of protecting a curvilinear confining surface against the abrasive effect of said moving solid particles normally directed against said surface which comprises subjecting said stream to a controlled field of force operative to deflect at least a portion of said particles from their normal path into a path spaced from said surface.

6. In the transportation of solid magnetic particles entrained in a moving fluid stream, the method of protecting a curvilinear confining surface from the abrasive action of said solid particles normally directed against said surface which comprises applying a magnetic field operative to attract and hold a predetermined layer of said particles upon said surface.

7. In the transportation of solid magnetic particles entrained in a moving stream of gasiform fluid, the method of protecting a curvilinear confining surface from the abrasive action of said solid particles normally directed against said surface which comprises applying a magnetic field operative to deflect particles away from said surface.

8. In the transportation of solid particles entrained in a gasiform stream, the method of protecting a curvilinear confining surface against abrasion by said solid particles normally directed against said surface substantially without changing the quantity of said particles entrained in said gasiform stream which comprises subjecting said stream, in the vicinity of said surface against which said solid particles are normally directed, to the influence of a controlled field of force operative to alter the movement of at least a portion of said particles so as to substantially lessen the abrasion of said surface.

9. The method as defined in claim 8 wherein said field of force is an electrostatic field so disposed as to attract a protective layer of particles to said surface.

10. In the transportation of comminuted non-magnetic solids by suspension in a moving fluid stream, the method of controlling the abrasive contact of said solids with a curvilinear surface confining said fluid stream, which comprises adding to said comminuted non-magnetic solids a magnetic material, and subjecting said moving fluid stream and suspended solids to a magnetic field operative to attract a protective layer of magnetic material to said curvilinear surface.

11. The method as defined in claim 10 wherein said magnetic material is added as discrete particles to said comminuted non-magnetic solids.

12. The method as defined in claim 10 wherein said magnetic material is added by physically combining the same with at least a portion of said comminuted non-magnetic solids.

13. In the transportation of comminuted non-magnetic solids by suspension in a moving gasiform stream, the method of protecting a curvilinear confining surface from the abrasive action of said solids normally directed against said surface, which comprises adding to said comminuted non-magnetic solids a magnetic material, and applying a magnetic field operative to attract a protective layer of magnetic material to said curvilinear surface.

14. The method as defined in claim 13 wherein said magnetic material is added as discrete particles to said comminuted non-magnetic solids.

PAUL W. GARBO.

REFERENCES CITED

The following references are of record in the file of this patent:

UNITED STATES PATENTS

| Number | Name | Date |
|---|---|---|
| 573,741 | Whitacre et al. | Dec. 23, 1896 |
| 584,968 | Taylor | June 22, 1897 |
| 998,486 | Fauntleroy | July 18, 1911 |
| 1,846,365 | Seipp | Feb. 23, 1932 |
| 2,350,759 | Hilmer et al. | June 6, 1944 |